(12) United States Patent
Manousakis et al.

(10) Patent No.: US 10,377,095 B2
(45) Date of Patent: Aug. 13, 2019

(54) PRINTED FACETS

(71) Applicant: HP INDIGO B.V., Amstelveen (NL)

(72) Inventors: Stylianos Manousakis, Sant Cugat del Valles (ES); Amir Gaash, Ness Ziona (IL); Ronald A. Askeland, San Diego, CA (US)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/752,793

(22) PCT Filed: Aug. 20, 2015

(86) PCT No.: PCT/US2015/046043
§ 371 (c)(1),
(2) Date: Feb. 14, 2018

(87) PCT Pub. No.: WO2017/030587
PCT Pub. Date: Feb. 23, 2017

(65) Prior Publication Data
US 2018/0257324 A1    Sep. 13, 2018

(51) Int. Cl.
| | | |
|---|---|---|
| *G03B 41/00* | (2006.01) |
| *B29D 11/00* | (2006.01) |
| *G02B 27/22* | (2018.01) |
| *B42D 25/324* | (2014.01) |
| *G02B 3/00* | (2006.01) |
| *B33Y 80/00* | (2015.01) |
| *B33Y 10/00* | (2015.01) |

(Continued)

(52) U.S. Cl.
CPC ........ *B29D 11/00278* (2013.01); *B29C 64/10* (2017.08); *B33Y 10/00* (2014.12); *B33Y 30/00* (2014.12); *B33Y 80/00* (2014.12); *B42D 25/324* (2014.10); *G02B 3/005* (2013.01); *G02B 3/0012* (2013.01); *G02B 3/0056* (2013.01); *G02B 27/2214* (2013.01)

(58) Field of Classification Search
USPC ........................................................ 396/327
See application file for complete search history.

(56) References Cited

U.S. PATENT DOCUMENTS

| 5,330,799 A | 7/1994 | Sandor |
| 6,146,032 A | 11/2000 | Dunham |

(Continued)

FOREIGN PATENT DOCUMENTS

| CN | 104853924 | 8/2015 |
| CN | 104854967 | 8/2015 |

(Continued)

OTHER PUBLICATIONS

Liu Haoxue, et al., "A Method to Get Realistic 3D Sensation Image from a Single Image", 2008 International Conference on Computer Science and Software Engineering, 3 pages.

*Primary Examiner* — Rodney E Fuller
(74) *Attorney, Agent, or Firm* — HP Inc. Patent Department (57) ABSTRACT

Methods and devices for a lenticular image product include a print media, a printed faceted surface disposed on the print media, an interlaced image printed on the printed faceted surface, and a printed lenticular lens printed on the printed interlaced image and the printed faceted surface. The lenticular lens can be disposed over the print media selectively.

20 Claims, 9 Drawing Sheets

(51) Int. Cl.
*B33Y 30/00* (2015.01)
*B29C 64/10* (2017.01)

(56) References Cited

U.S. PATENT DOCUMENTS

| | | | |
|---|---|---|---|
| 7,083,340 B2 * | 8/2006 | Goggins | G03B 21/625 |
| | | | 359/619 |
| 7,796,145 B2 | 9/2010 | Almog et al. | |
| 8,256,888 B2 * | 9/2012 | Horn | B29D 11/00278 |
| | | | 347/102 |
| 2001/0048458 A1 | 12/2001 | Pilu | |
| 2003/0016370 A1 * | 1/2003 | Goggins | H04N 1/00201 |
| | | | 358/1.2 |
| 2004/0219302 A1 | 11/2004 | Krause | |
| 2005/0152040 A1 * | 7/2005 | Goggins | B41M 3/003 |
| | | | 359/619 |
| 2005/0152729 A1 * | 7/2005 | Goggins | G03B 21/625 |
| | | | 400/70 |
| 2006/0285215 A1 | 12/2006 | Wu | |
| 2008/0228293 A1 * | 9/2008 | Tanaka | B41J 3/543 |
| | | | 700/52 |
| 2009/0315321 A1 * | 12/2009 | Michieli | B32B 37/02 |
| | | | 283/111 |
| 2012/0087013 A1 | 4/2012 | Liu et al. | |
| 2012/0099199 A1 * | 4/2012 | Vasylyev | B29D 11/00278 |
| | | | 359/530 |
| 2012/0218633 A1 | 8/2012 | Cincotti et al. | |
| 2013/0258678 A1 | 10/2013 | Nichols et al. | |
| 2014/0043679 A1 | 2/2014 | Hwang | |
| 2014/0063611 A1 | 3/2014 | Raymond et al. | |
| 2014/0146388 A1 * | 5/2014 | Kautz | G02B 27/2214 |
| | | | 359/463 |
| 2014/0374958 A1 | 12/2014 | Taniuchi | |
| 2015/0024169 A1 | 1/2015 | Martin | |
| 2015/0079327 A1 * | 3/2015 | Kautz | B29C 64/106 |
| | | | 428/64.1 |
| 2016/0097996 A1 * | 4/2016 | Gilan | B44C 1/1729 |
| | | | 101/227 |
| 2016/0243870 A1 * | 8/2016 | Fu | B41M 5/504 |
| 2017/0227878 A1 * | 8/2017 | Mann | C09B 67/0002 |

FOREIGN PATENT DOCUMENTS

| | | | | |
|---|---|---|---|---|
| FR | 2945372 A1 * | 11/2010 | | B41M 3/00 |
| JP | 2007233105 | 9/2007 | | |
| WO | WO-2015018941 | 2/2015 | | |

* cited by examiner

PRINTED FACETS

BACKGROUND

A lenticular lens is an array of lenses that can be placed over an image so that different aspects of the images are visible when the array is viewed from different angles. One example of a lenticular lens is a composite lens used in lenticular images. The lenses in such arrays can be cylindrical so as to magnify different aspects of an image at different angles. The different aspects of the underlying image can arrange so that the lenses produce optical illusions or make images that appear to change as the image is viewed from different angles. For example, lenticulars lenses can be used to simulate the transition from one image to another, short motion clips, and various other types of scenes with depth or movement.

To achieve the desired effect, a lenticular lens may be aligned to magnify different parts of an underlying image depending on the angle from which the image is viewed. Accordingly, two or more images can be divided into strips. The strips can then be interlaced so that, for example, the first strip of the first image is followed by a first strip of the second image, then followed by a second strip of the first image, followed by a second strip of the second image, and so on. A lenticular array is aligned over the interlaced image such that the strips of the first image are viewable when viewed from one set of angles, and the strips of the second image are viewable when viewed from another set of angles. Different effects can be achieved by using more or fewer strips per magnifying lens in the lenticular lens and by altering the optical power and other dimensions of the lenses.

BRIEF DESCRIPTION OF THE DRAWINGS

The accompanying drawings, which are incorporated in and constitute a part of the specification, illustrate several examples of the present disclosure and together with the description, serve to explain by several specific examples the principles of the disclosure.

DETAILED DESCRIPTION

Implementations of the present disclosure include methods and devices for printing simplex lenticular images on various types of print media. Simplex printing refers to printing processes that apply printable material to one side of a print media. Such implementations can include the use of multiple layers of printing materials to generate a faceted printing surface. An interlaced image that includes strips of multiple complementary or contrasting images can be disposed on selected facets. In particular, strips of each of the component images can be printed so that they are interlaced on corresponding facets of the faceted surface. For example, the faceted surface can be printed to include elongated ridges having a triangular profile. As such, one facet, or side, of such a ridge can be disposed at one angle relative to the print media, while another facet or side can be disposed at another angle. The strips of a first image can be arranged on one side of the ridges, while the strips of a second image can be arranged on the other side of the ridges. Implementations of the present disclosure can include printing an array of lenses, also referred to herein as a lenticular lens, arranged over regions between the ridges using various transparent, translucent, clear, and/or white printing materials. Any such materials can be selected to have optical properties that make it possible to form suitable lens structure. In such implementations, the lenticular lenses and/or the faceted surface can be formed one layer at a time with optical properties and dimensions chosen to magnify different aspects of the interlaced images depending on the viewing angle.

To illustrate various features and advantages of the present disclosure, specific example implementations are described below in detail and in reference to the accompanying figures. Reference to the examples herein are intended to be illustrative only and are not intended to limit the scope of the present disclosure.

Figure 1:
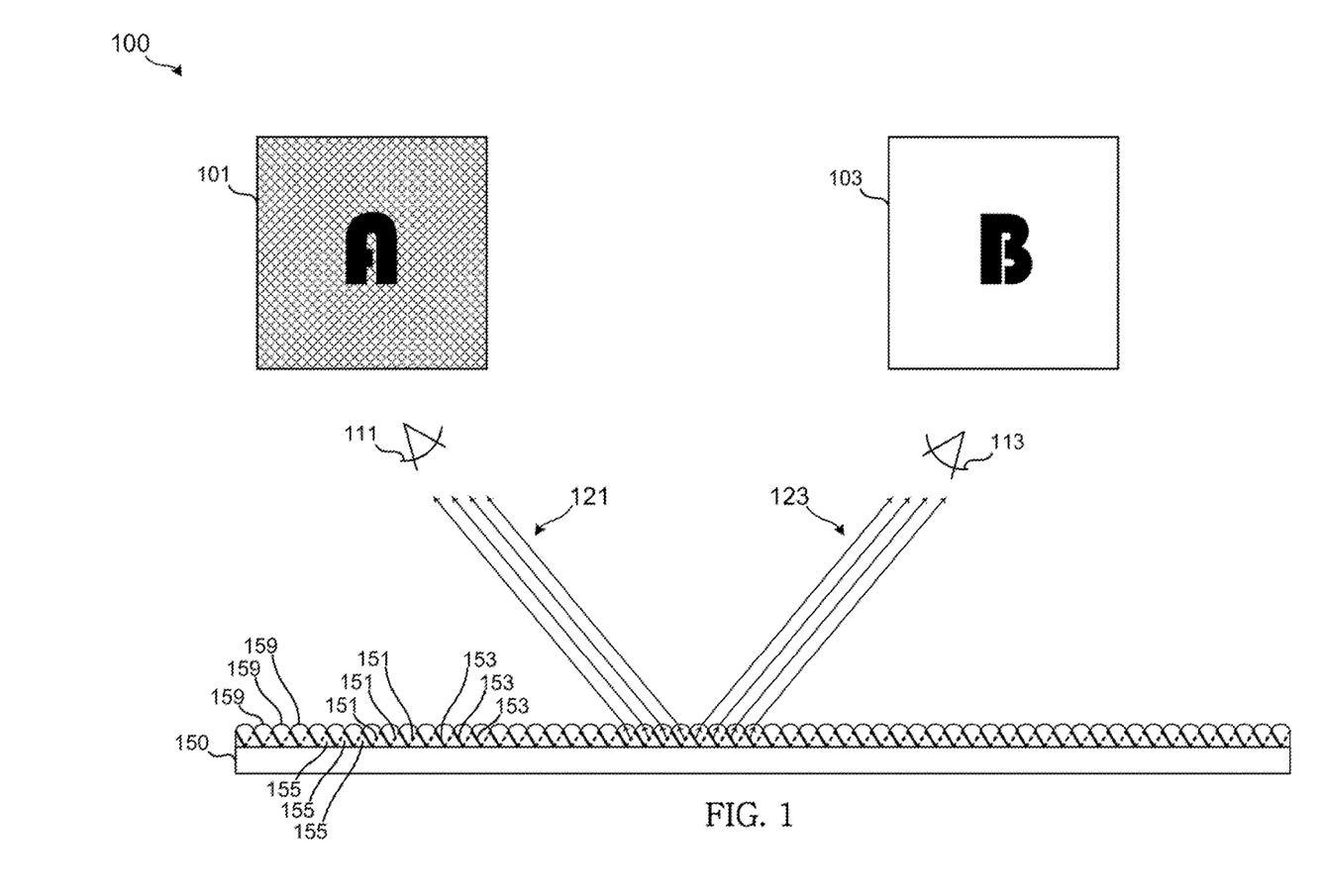
FIG. 1 illustrates an example simplex lenticular image printed according to implementations of the present disclosure.

FIG. 1 depicts an example simplex printed lenticular image 100 according to implementations of the present disclosure. A lenticular image can be any image that includes a combination of printed interlaced images, printed facets, and/or printed lens elements that provide different views of the interlaced image when viewed from different angle or perspectives. As such, a lenticular image 100 can include an interlaced image, a faceted surface, and/or a lenticular lens. The lenticular lens can include an array of magnifying lenses. The magnifying lenses can include linear elements arranged along one or more dimensions of the print media 150. The top surface of the magnifying lenses can have radii and thicknesses to achieve the desired magnification or other optical properties of the lenticular image. As used herein, the term "lenticular image" can refer to any physical result of various implementations of the present disclosure. For example, the lenticular image can include a postcard, a sign, a bookmark, a banner, or any other type of printed product or object.

The interlaced image can include component images 101 and 103. In the example shown in FIG. 1, the interlaced image includes two component images, but in other implementations of the present disclosure, the interlaced images can include more than two component images. When a viewer views the lenticular image 100 from various perspectives, such as perspective 111 and 113, different parts of the interlaced image can be magnified and/or made visible. For example, when viewed from perspective 111, the lenses 151 will refract the light 121 so as to make component image 101 visible. When viewed from perspective 113, the lenticular lenses will refract the light 123 so as to make the component image 103 visible. From other perspectives at different angles relative to the surface of the print media 150, the lenticular image will appear to transition from one component image to another. Accordingly, by changing perspective relative to the surface of the lenticular image 100, the lenticular image 100 will appear to transition from one component image 101 to another component image 103.

As shown, the lenticular image can be printed on a print media 150. The specific physical and optical characteristics of the print media 150 can vary based on the desired visual effect, intended use, price point, and other considerations for the lenticular image 100. For example, for inexpensive advertisement handouts, the print media 150 can include any type of paper, card stock, or cardboard. However, for outdoor or permanent installations, the print media 150 can include various types of durable flexible or rigid materials such as vinyl, acrylic, metal, plastic, wood, and the like. Because implementations of the present disclosure can be printed as a simplex image (e.g., on one side of the print media 150), any type of clear, translucent, or opaque print media 150 can be used. In particular, various aspects of the present disclosure can be implemented using adaptable printing techniques that allow for printing on large variety of print media. For example, implementations of the present disclosure can be implemented using a liquid photoelectric digital printing press in which electrostatically formed patterns of printing material are transferred to an intermediate transfer media (e.g., a transfer blanket) before being physically transferred or pressed onto the print media 150. Such printing presses are well suited for printing on print media having varied levels of rigidity, porosity, smoothness, or other characteristics that can affect the print quality in other types of printers.

As further illustrated in FIG. 1, the example lenticular image 100 can include various physical and optical features. For example, lenticular image 100 can include a printed faceted surface applied to the print media 150. In the example shown, the faceted surface can include ridges 155 having a triangular profile formed layer-by-layer of printing material. In some implementations, the ridges 155 can be formed by printing multiple layers of a suitable printing material such as latex, white ink, UV cured epoxy, acrylics, and the like. The dimensions and thickness of the layers of printing material can vary from one another to generate a three-dimensional form of ridges. The shape and/or configuration of the resulting faceted surface or the component ridges 155 can be printed based on a model that defines the profile, thickness, and material of the facets surface. In some implementations, the faceted surface or the component ridges 155 can be printed based on a lens model that defines the corresponding the optical properties of the magnifying lenses 159 or the lenticular lens as a whole. Accordingly, the dimensions of the faceted surface can be based on a model of the faceted surface and/or an optical model of the lenticular lens.

Each of the printed ridges 155 can include multiple facets at various angles relative to the surface of the print media 150. In the example shown, the ridges 155 have a triangular profile such that each ridge 155 has a facet 151 and a facet 153 as shown. Ridges having other profile shapes are also possible. In addition, the relative angles and thicknesses of the ridges 155 are exaggerated for illustrative purposes in FIG. 1. As such, the angles of facets 151 and 153 relative to the surface of the print media 150 can be greater or less than illustrated. Furthermore, the relative angles of the facets 151 and 153 to the surface of the print media 150 can be different from one another.

In some implementations, printing the multiple layers of printing material to form the ridges 155 can also include depositing pigments or colorants on the edge of the layers that can be built up to generate strips of the component images 101 or 103 on the facets 151 and 153 that make up the interlaced image of the lenticular image 100. Accordingly, printing the ridges 151 and the strips of the interlaced image can occur during the same iterative or layer-by-layer printing process used to form the faceted surface.

In other implementations, the ridges 155 of the faceted surface can be printed layer-by-layer before the strips of the component images 101 and 103 are printed on the corresponding facets 151 in 153. For example, using one iterative printing process, the ridges 155 can be built up layer-by-layer using a base printing material such as a white ink or clear ink. As described herein, the white or clear ink can include various types of latex materials and UV curable materials with suitable optical properties for forming lenses. Accordingly, once the ridges 155 are formed, a similar or different printing process can be used to deposit the strips of the component images 101 and 103 on the corresponding facets 151 and 153.

With the strips of the component images 101 and 103 formed on the corresponding facets 151 and 153, some implementations of the present disclosure can include printing corresponding magnifying lenses 159 to form the lenticular lens. In other implementations, the faceted surface printed with the interlaced image can remain uncovered and the lenticular (e.g., motion, morphing, etc.) effect can be independent of a lenticular lenses and dependent on the viewing angle only. As such, the component image 101 would be visible from various angles on the side of perspective 111, and component image 103 would be visible from various angles on the side of perspective 113.

In implementations that include forming a lenticular lens, forming the component magnifying lenses 159 can be achieved by iteratively printing an appropriate lenticular material over the valleys between the ridges 155 according to an optical profile or model of the lenticular lens. For example, the magnifying lenses 159 can be formed by printing a printing material having sufficient translucency or transparency to refract incident and reflected light. As such, the magnifying lenses 159 can be formed of multiple layers of the printing material having varying widths to form a cross sectional profile with an appropriate optical power and other optical characteristics. The specific optical properties and characteristics can be defined in a corresponding optical model of the lenticular lens.

Figure 2:
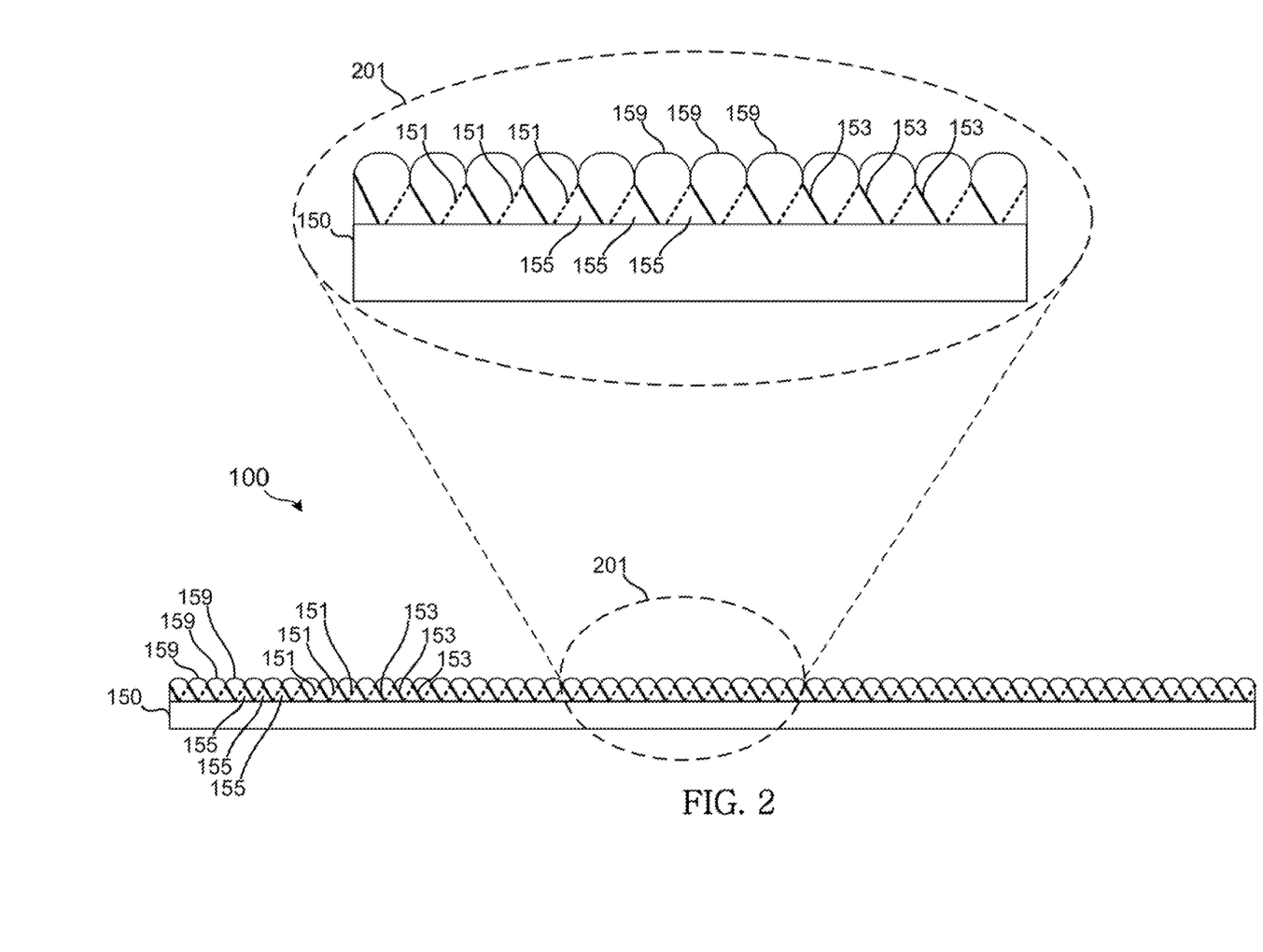
FIG. 2 illustrates an expanded view of an example simplex printed lenticular image.

FIG. 2 depicts an enlarged view of section 201 of the lenticular image 100 to illustrate various features in more detail. As can be seen in FIG. 2, the center of the optical profile of the magnifying lenses 159 can be centered over the valleys formed by the ridges 155. However, in some implementations, it may be desirable for the centers of the optical profile of the lenses 159 to be shifted in one direction or another depending on the intended viewing angles of the lenticular image 100. For example, if the lenticular image 100 will be used in signage that is typically viewed from an oblique angle based on its physical orientation to a thoroughfare (e.g., a signed that will be attached to a wall that is at a particular angle to the road), the profiles of the magnifying lenses 159 can be shifted one way or the other to achieve the desired effect when viewed from that oblique angle. Furthermore, FIG. 2 depicts the strips of the component images 101 and 103 on the facets 151 and 153 of the ridges 155. Accordingly, the facets 151 that include the strips of the component image 101 are angled in one direction, while the facets 153 that include the strips of the component image 103 are angled in another direction. Each of the directions of the facets 151 and 153 can be defined by a corresponding angle at which the plane of the facets are oriented relative to the surface of the print media 150.

Figure 3:
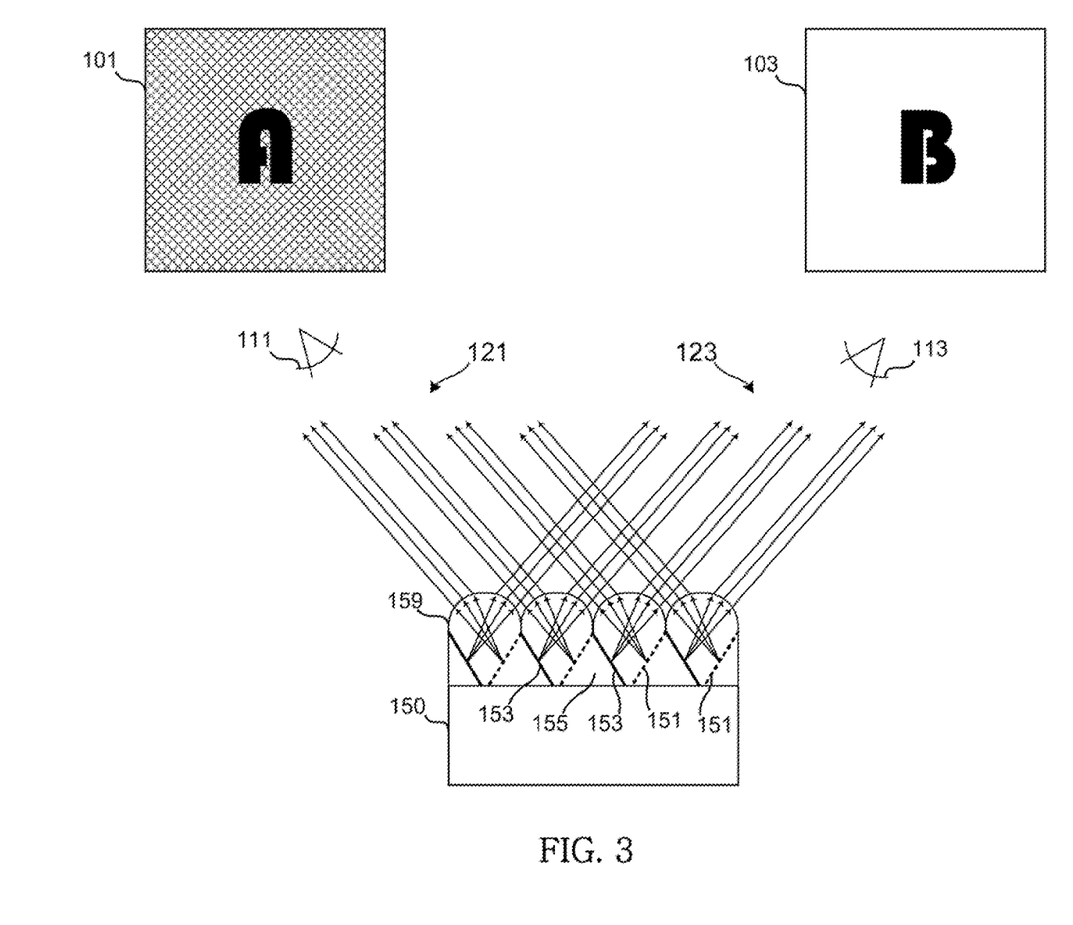
FIG. 3 illustrates the refraction of light of an example simplex printed lenticular image.

FIG. 3 depicts example paths of light 121 and 123 refracted and reflected from the strips of the component images 101 and 103 printed on the corresponding facets 151 and 153. The refracted light paths 121 and 123 represent the image of the components images 101 and 103 perceived by the viewer through magnifying lenses 159 at perspective locations 111 and 113, respectively. The transition between the two perspectives can create the illusion of movement or modulation between the component images 101 and 103.

Figure 4:
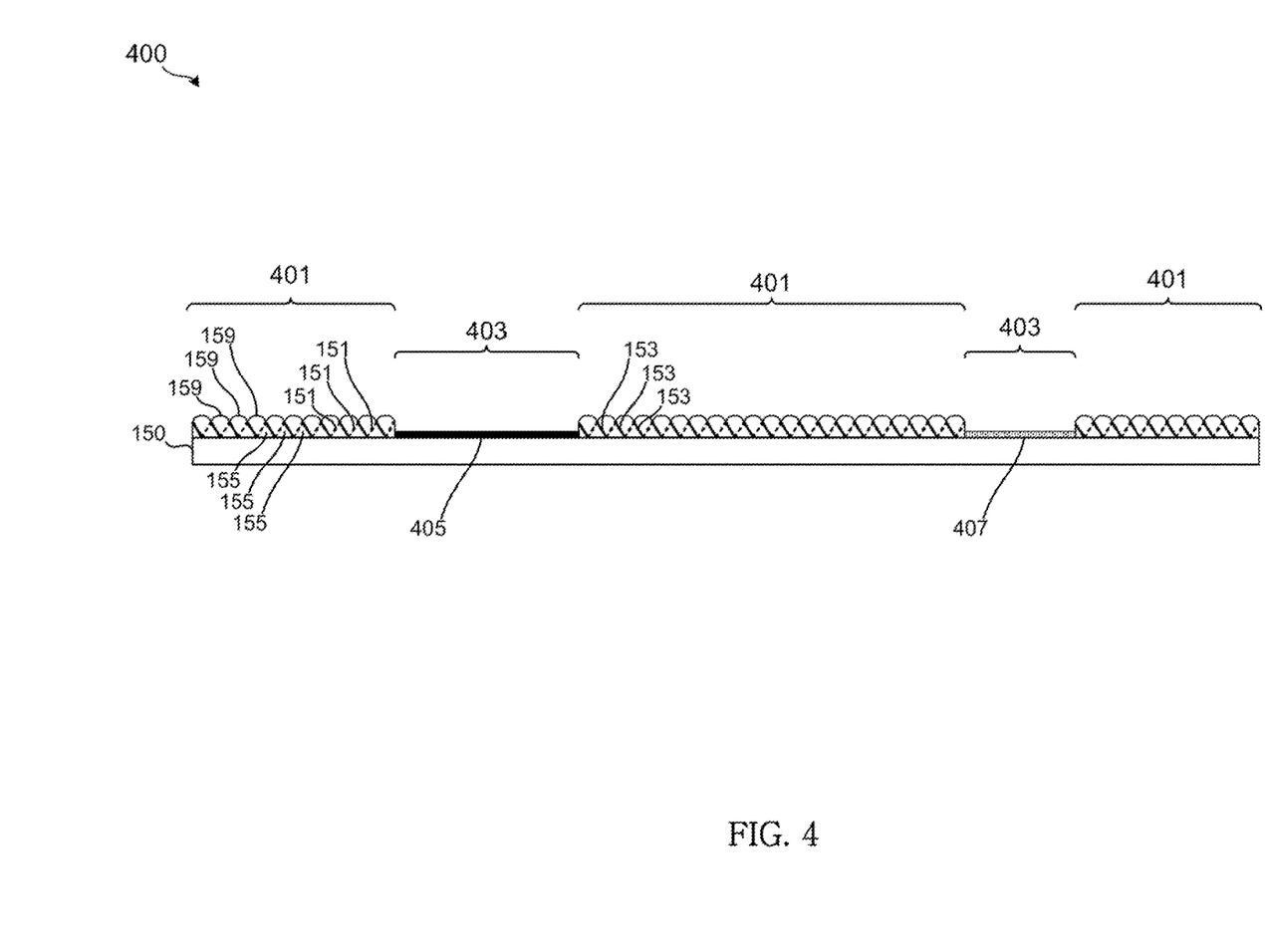
FIG. 4 illustrates example selective printing of lenticular images over the surface of a simplex printed print media.

In some implementations, the component images 101 and 103 can include individual sets of component images. For example, the component images 101 and 103 can include any combination of photographs, text, drawings, graphics, and the like. In some examples, the component images 101 and 103 can include some regions that are identical to one another and other regions that are different from one another. In some examples, images generated using various implementations of the present disclosure can include regions that include lenticular lenses and regions that do not include lenticular lenses. FIG. 4 depicts one such example.

As shown in FIG. 4, the composite image 400 can include regions 401 that include lenticular images and regions 403 that include do not include lenticular images. Accordingly, implementations of the present disclosure include the ability to selectively form lenticular images on only certain regions of the print media 150. In some implementations, composite image 400 can include a region 403 that has an image 405 different from the image 407 in another region 403. For example, the image represented by 405 can include a photograph while the image represented by 407 can include graphics or text.

In some implementations, lenticular lenses in the various regions 401 can be oriented in the same direction. In other implementations, the orientation of the lenticular lenses in regions 401 arranged at angles to one another. For example, the lenticular lens in one region 401 can be arranged in a vertical orientation so as to produce a lenticular image effect when perspective changes in a horizontal direction. Another region 401 can include a lenticular lens arranged in a horizontal orientation so as to produce a lenticular image effect when perspective changes in a vertical direction. Similarly, another region 401 can include a lenticular lens arranged at another angle to produce yet another lenticular image effect. In any of such implementations, the ridges 155 and the strips of the component images of the corresponding underlying interlaced image can be arranged to match or work with the orientation of the lenticular lens.

For example, a sign printed according to various implementations of the present disclosure can include a mixture of lenticular images in regions 401 and other images printed on the print media in regions 403. In such examples, the sign can include lenticular images that mimic movement (e.g., animal movements, blinking arrows, twinkling stars, etc.) alongside static text to create a more visually appealing or attractive signs. In examples implemented using a digital press, such as a liquid electro-photographic digital press, relatively short runs of advertising material that selectively use lenticular images can be produced at affordable costs relative to other lenticular image generation techniques.

Figure 5:
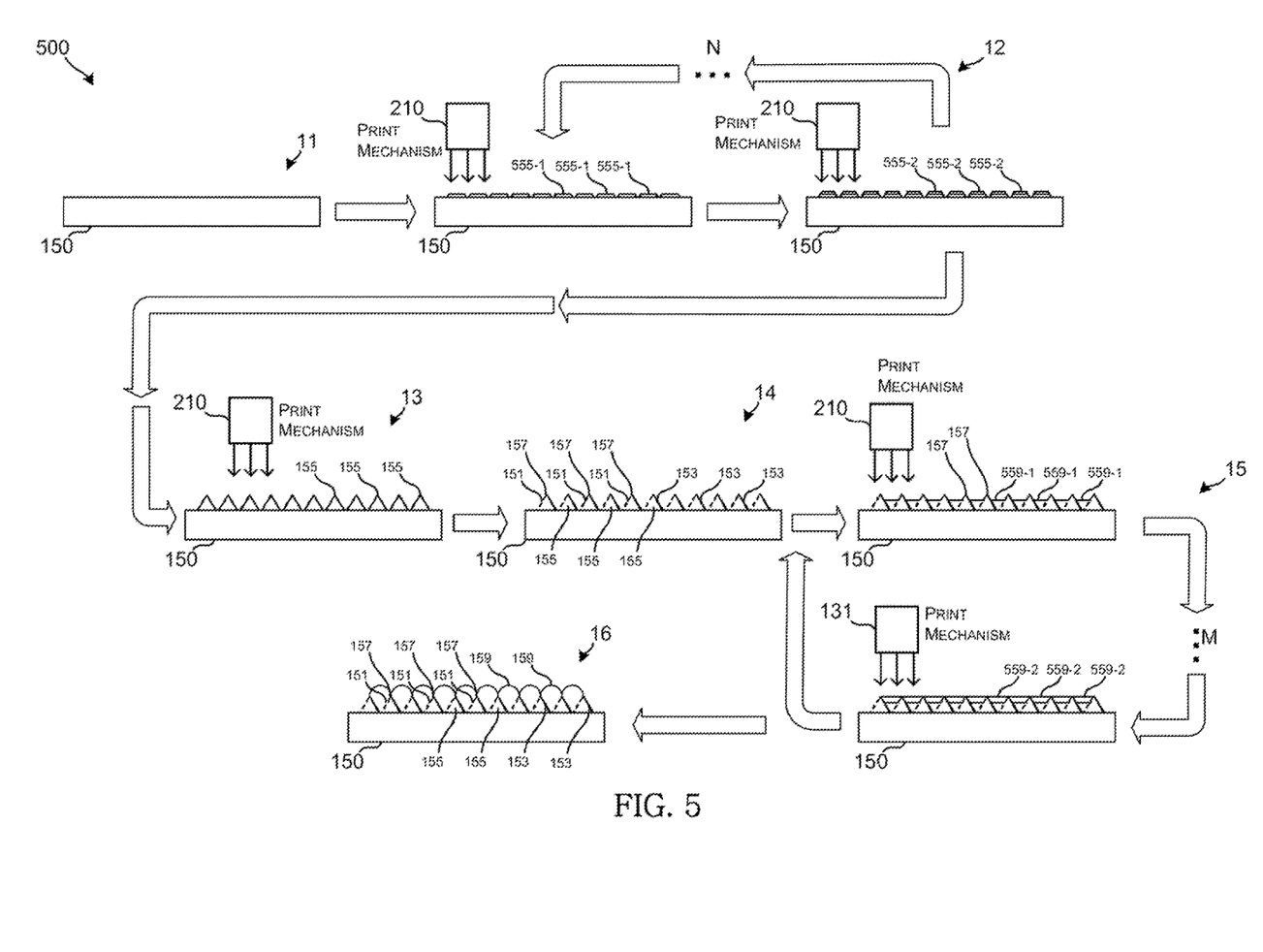
FIG. 5 illustrates an example process for printing simplex lenticular images.

FIG. 5 illustrates a schematic representation of a process 500 for generating lenticular images and composite images according to various implementations of the present disclosure. Process 500 can begin at reference 11 in which a substrate or print media 150 is selected. As described herein, the process 500 can include a simplex printing process such that lenticular images can be formed on any clear, translucent, transparent, or opaque print media. Once the print media 150 is selected, a print media handler (not shown) can provide the print media 150 to print mechanism 210. In various implementations described herein, the media handler and the print mechanism 210 can be included in various types of printers or printing presses. For example, the media handler and/or the print mechanism 210 can be included in a digital press such as a liquid electro-photographic digital press.

The print mechanism 210 can selectively apply multiple layers 555 of a base material to generate a faceted surface on the print media 150. As described herein, various example faceted surfaces can include ridges 155 having various geometric profiles. The example profile depicted in FIG. 5 is triangular. The layers 555 can be built up iteratively or layer-by-layer by repeating the operations shown at reference 12. As such, the print mechanism 210 may apply N, where N is an integer, layers 555 of base material to generate the faceted surface of ridges 155 on the print media.

In alternative implementations, the process at reference 13 can be skipped if at reference 12 the print mechanism 210 applies a portion of the composite image at the edges of the layers of 555 to iteratively build up the image disposed on the facets 151 and 153 at the same time that the ridges 155 are generated. In such implementations, each layer 555 can include a portion of colorant at the edge of the layer of base material (e.g., white or clear ink) that makes up the bulk of the ridges 155.

At reference 13, once the ridges 155 of the faceted surface are generated, the print mechanism 200 then can print strips of the component images of an interlaced image onto the corresponding facets. As shown at reference 14, the facets 151 can include corresponding strips of one component image while the facets 153 can include corresponding strips of another component image.

With the ridges 155 having strips of the component images formed on the facets 151 and 153, respectively, implementations of the present disclosure can include using the print mechanism 210 to iteratively or layer-by-layer print lenticular lenses.

As shown, to print lenticular lenses, the print mechanism 210 can print successive layers 559 of lenticular material over the facets 151 and 153. Printing the magnifying lenses 159 can include printing as many as M, where M is an integer, layers 559 of the lenticular material, at reference 15.

In various implementations the lenticular material can include a clear or semi clear material or ink that has specific optical properties, such as a specific refractive index, a specific dispersion coefficient, an absorption spectrum, and the like. As such, the term "lenticular material", as used herein, is used to refer to any printable material that has optical and/or physical properties that can form the magnifying lenses of the lenticular lens to achieve the desired lenticular image or effect Based on the material and/or optical properties of the lenticular material, a lenticular lens profile or model may be chosen. As such, the magnifying lenses 159 can be generated by iteratively laying down multiple layers 559 of varying widths of lenticular material. The lenticular profile may be based on the optical properties of the lenticular material as well as the desired optical effect for the lenticular image. In some examples, the desired optical effect may be to magnify one of the facets 151 or 153 selectively based on the viewing angle to generate the illusion of change or movement in the lenticular image.

At reference 16, FIG. 5 depicts a completed lenticular image formed on a print media 150 comprising composite images printed on corresponding facets 151 and 153 of the ridges 155. In the example shown, the magnifying lenses 159 are formed over the valleys created by the facets 151 and 153 between the peaks 157. In some implementations, the lenticular image at reference 16 need only to air dry to be permanently fixed. In other implementations, the lenticular image at reference 16 can be treated to cure or fix the final lenticular image. For example, in implementations that use UV curable materials, the lenticular image at reference 16 can be exposed to UV light. In some implementations, the lenticular image at reference 16 can be heat treated to harden or otherwise fix the materials. In other implementations, the example lenticular image at reference 16 can be treated with a chemical fixer or hardener.

Figure 6A:
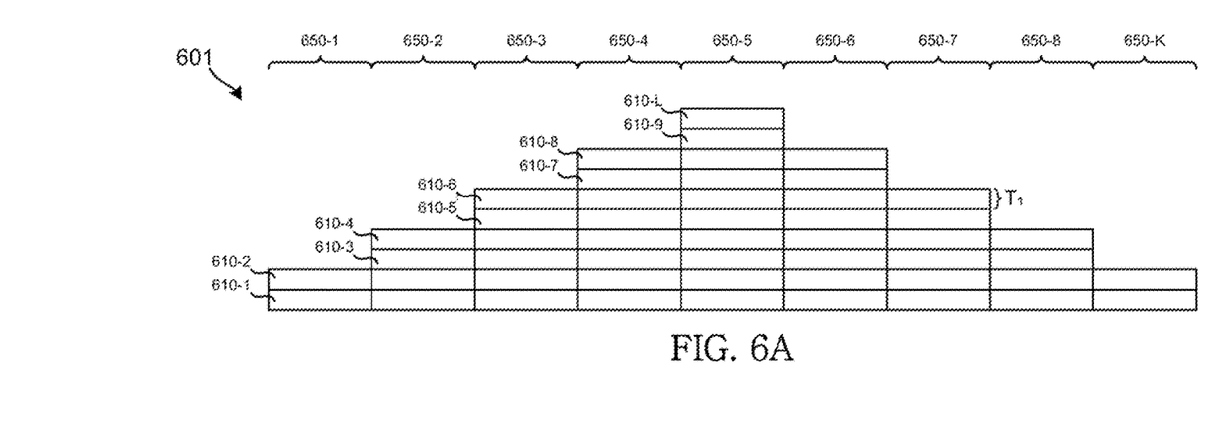
FIGS. 6A and 6B illustrate example profiles of printed lenticular lenses for printed simplex lenticular images.
Figure 6B:
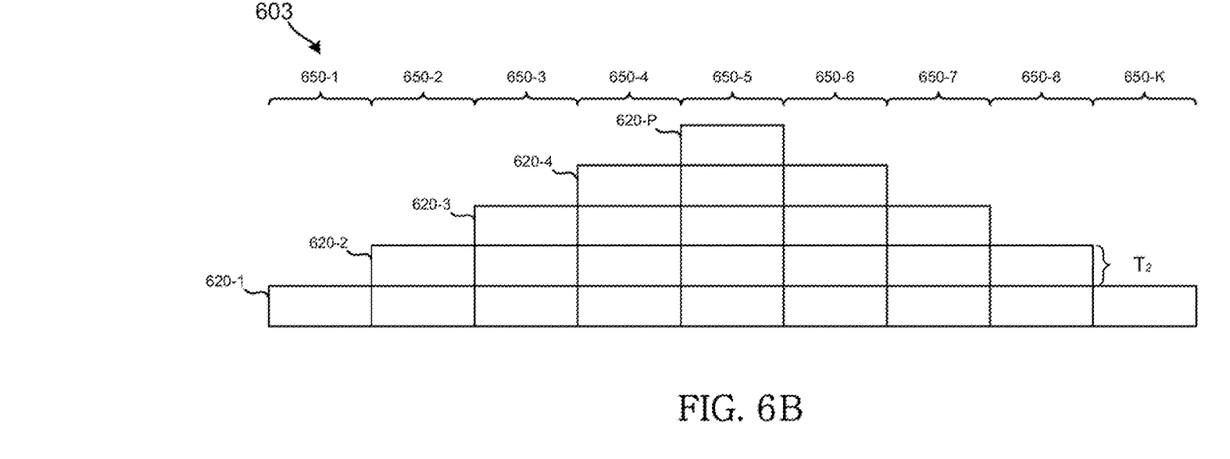

FIGS. 6A and 6B depict the composite profile of a printed lenticular lens 159 and/or a ridge 155. As shown, the layers of materials 610 and 620 can vary in thickness based on the material properties of the printed material. For example, the layer 610 of the lens profile 601 of FIG. 6A can be printed using latex. In such implementations, the widths 650 of each pixel in the layers 610 can be based on the capabilities of the printing technique used. For example in a liquid electro-photographic digital press, the width 650 can be approximately 21 μm such that the total width of the lens profile 601 is the number of pixels wide times 21 μm (e.g., K×21 μm). Similarly, the thickness $T_1$ of layers 610 can be approximately 3 μm, such that the overall lens height of the lenticular lens 601 is 3 μm times the number of layers (e.g., L×3 μm). If other materials are used, such as a UV curable epoxy, to print lenticular lenses, the thickness of each layer can be greater. For example, lenticular lens profile 630 having a similar lens profile height to that in lens profile 601 can be formed using layers 620 having a thickness $T_2$ that is greater than $T_1$. For example, $T_2$ can be approximately 30 μm. As such, lens profile 603 can be formed using fewer layers than the lenticular lens profile 601. Fewer layers means fewer passes by the printing mechanism 210 to generate the lens profiles of the lenticular lens and/or the corresponding faceted surface. The fewer the number of layers, the faster the lenticular images can be printed.

Figure 7:
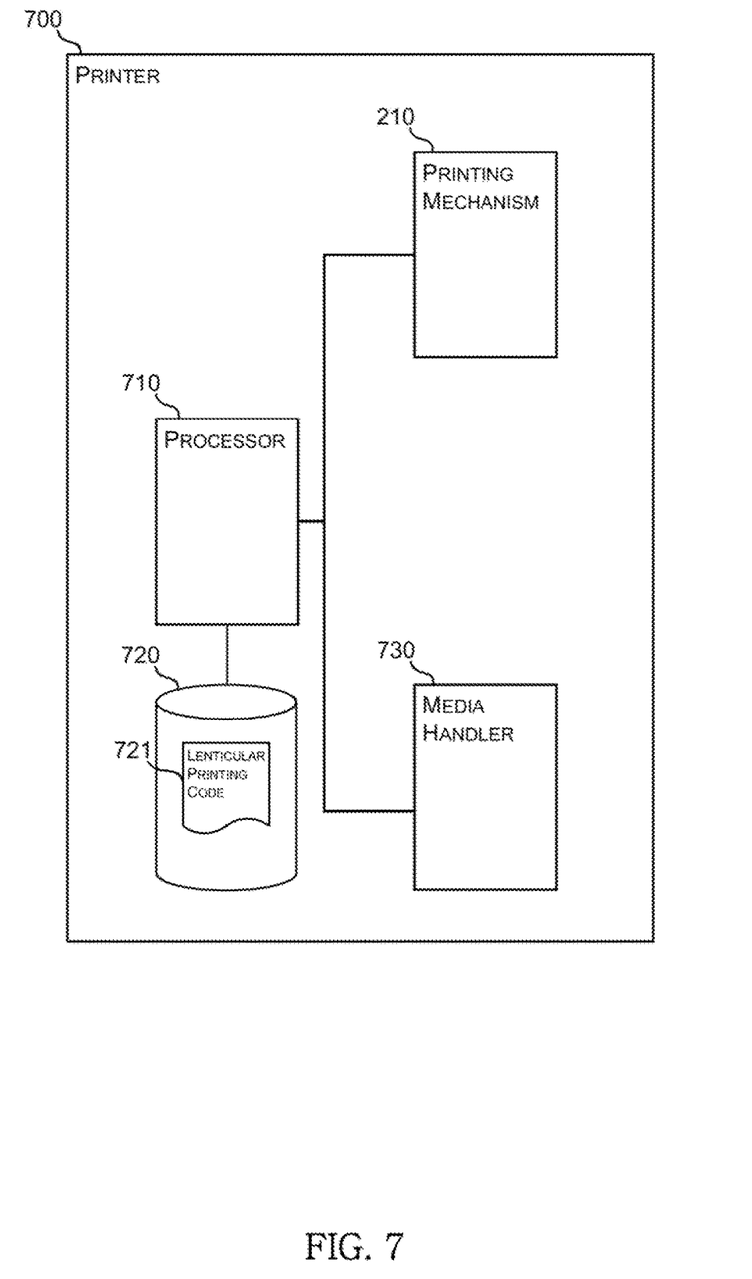
FIG. 7 depicts a schematic diagram of an example printer for printing simplex lenticular images.

FIG. 7 depicts a schematic representation of an example printer 700 in which various examples of the present disclosure can be implemented. As shown, the printer can include a processor 710 coupled to a print mechanism 210, a media handler 730, and a memory 720. Memory 720 can store corresponding executable code including instructions that when executed by the processors 710 cause the processor 710 to perform operations according to the example implementations described herein using the other components of the printer 700.

The functionality of the components of printer 700 and the methods described herein can be implemented using any combination of hardware and executable code, using an application specific integrated circuit (ASIC), or any other combination of digital and/or analog circuitry and components. For example, the functionality of process 500, described above in reference to FIG. 5, and method 800, described below in reference to FIG. 8, can be implemented by processor 710 generating control signals based on corresponding executable code. The executable code can include instructions for operating the printing mechanism 210 and/or media handler 730 according instructions received by the printer 700 and/or stored in memory 720 as lenticular printing code 721. As such, lenticular printing code 721 can include instructions that when executed by a processor 710 cause the processor to control various operations of the printer 700 or printing mechanism 210 described herein.

The processor 710 may be a microprocessor, microcontroller, application specific integrated circuit (ASIC), or the like. According to an example implementation, the processor 710 is a hardware component, such as a circuit. The memory 720 can include any type of volatile or non-volatile memory, such as dynamic random access memory (DRAM), electrically erasable programmable read-only memory (EEPROM), magneto-resistive random access memory (MRAM), memristor, flash memory, floppy disk, a compact disc read only memory (CD-ROM), a digital video disc read only memory (DVD-ROM), or other optical or magnetic media, and the like, on which executable code may be stored.

The printing mechanism 210 can include any type of printing technology. For example, the printing mechanism can include a inkjet print head (e.g., a thermal inkjet print head, a piezoelectric printhead, etc.), or a electro-photographic printing press (e.g., dry toner photoelectric digital press, a liquid electro-photographic digital press, etc.). The media handler can include any type of media handler for positioning, aligning, and/or moving the print media 150 as needed by the printer 700 or printing mechanism 210. In some examples, the media handler can be included in the printing mechanism 210.

Figure 8:
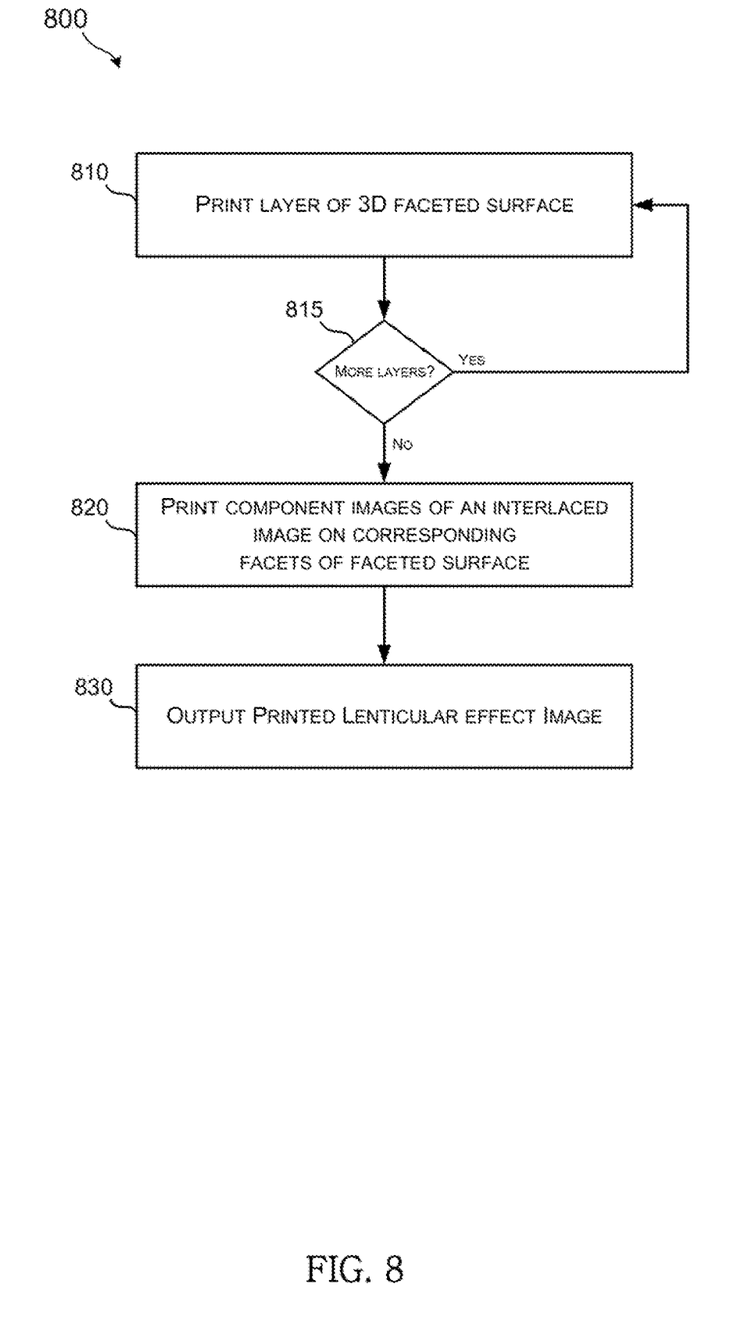
FIG. 8 is a flowchart of an example method for printing simplex lenticular effect images.

FIG. 8 depicts a flowchart of an example method 800 for printing simplex lenticular effect images. As described herein, the term "lenticular effect images" is used to refer to any faceted surface on which an interlaced image can be printed so that one or more images appear visible when viewed from different angles. As such, the term "lenticular effect" can refer to any effect that mimics, simulates, or imitates the transitions, motion, or appearance of a lenticular image. For example, a lenticular effect image can include a component image of a sun and a component image of a moon. The sun can be visible when viewed from one direction and the moon will be visible when viewed from another direction. In such implementations, there are viewing angles from which both component image are visible.

As shown the method 800 can begin by printing a layer of a three-dimensional faceted surface on a print media, at box 810. The first layer, and subsequent layers, of the three-dimensional faceted surface, can include a printable material such as an ink, epoxy, latex, toner, or the like. The width and thickness of the layer can be determined based on a three-dimensional model or other instructions implemented as executable code stored on a memory or received from an external device. For example, the thickness of a layer of printable material can be in the range of tens of microns. The width of a particular layer of printable material can vary based data in the three-dimensional model of the profile of the desired three-dimensional faceted surface at that particular location. At determination 815, if more layers remain in the three-dimensional model of the three-dimensional faceted surface, then another layer of printable material can be printed at box 810. Accordingly, multiple layers of printable material can be iteratively printed to form the three-dimensional faceted surface on the print media. Each of the multiple layers can have a particular thickness and width to achieve the desired profile of the three dimensional faceted surface.

At box 820, once all of the layers of the three-dimensional faceted surface are printed, the printer 700 can print and interlaced image on the corresponding facets of the multifaceted surface. The multifaceted surface can include a number of ridges having a geometric profile. As described herein, the interlaced image can include alternating strips of component images that can ultimately be viewed from different viewing angles relative to the surface of the resulting lenticular image. For example, strips of a first component image can be printed on one side of the ridges of the faceted surface and strips of a second component image can be printed on another side of the ridges or the faceted surface.

Once the interlaced image is disposed on the faceted surface, the final lenticular effect image can be output at box 830. As described herein, outputting the lenticular effect image can include fixing the interlaced image and/or the faceted surface.

Figure 9:
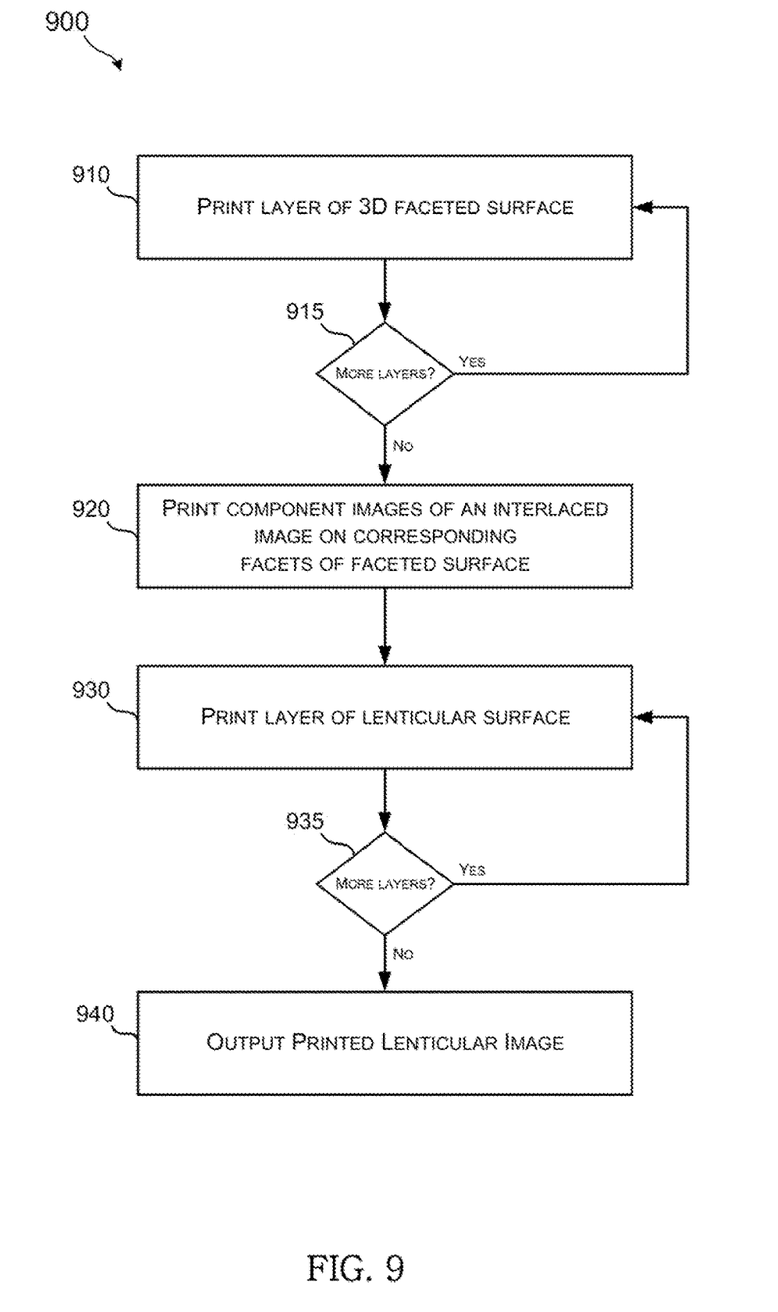
FIG. 9 is a flowchart of an example method for printing simplex lenticular images.

FIG. 9 depicts a flowchart of an example method 900 for printing simplex lenticular images. The processes described in boxes 910 through 920, are analogous to the processes described in reference to boxes 810 through box 820 in FIG. 8. At box 930, a lenticular lens can be applied to the interlaced image by printing a layers of printable materials to form an array of magnifying lenses. The first layer, and subsequent layers, of the lenticular lens can include a printable material such as an ink, epoxy, latex, toner, or the like. The width and thickness of the layer can be determined based on optical model or other instructions implemented as executable code stored on a memory or received from an external device.

The width of a particular layer of printable material in the lenticular lens can vary based data in the optical model for the desired magnifying lens at that particular location. At determination 935, if more layers remain in the optical model of the lenticular lens, then another layer of printable material can be printed at box 930. Accordingly, multiple layers of printable material can be iteratively printed to form the lenticular lens over the interlaced image on the faceted surface. Each of the multiple layers can have a particular thickness and width to achieve the desired profile or optical properties of the lenticular lens.

Once the last layer of printable material is applied to for the lenticular lens, the final lenticular image can be output at box 940. As described herein, outputting the lenticular image can include fixing the lenticular lens.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A printer comprising:
a printing mechanism;
a processor; and
a non-transitory computer readable medium coupled to the processor and comprising instructions that when executed by the processor cause the processor to:
print multiple layers of a base material using the printing mechanism to generate a surface comprising a plurality of facets on a surface of a print media; and
print an interlaced image on the plurality of facets using the printing mechanism.

2. The printer of claim 1 wherein the instructions further cause the processor to print multiple layers of a lenticular material using the printing mechanism to generate a plurality of lenticular lenses over the interlaced image.

3. The printer of claim 2 wherein the base material and the lenticular material are the same material.

4. The printer of claim 2 wherein the base material or the lenticular material comprise a white liquid electro-photographic ink.

5. The printer of claim 1 wherein the printing mechanism comprises a liquid electro-photographic digital press.

6. A method comprising:
printing multiple layers of a base material to generate a surface comprising a plurality of facets on a surface of a print media;
printing an interlaced image on the plurality of facets; and
printing multiple layers of a lenticular material to generate a plurality of lenticular lenses over the interlaced image.

7. The method of claim 6, wherein a first subset of the plurality of facets are at a first angle relative to the surface of the print media, and a second subset of the plurality of facets are at a second angle relative to the surface of the print media.

8. The method of claim 7 wherein the first angle and the second angle corresponding to an optical profile associated with the lenticular lenses.

9. The method of claim 6, wherein printing the multiple layers of the base material or printing the multiple layers of lenticular material comprise using a liquid electro-photographic printing press.

10. The method of claim 6, wherein printing the multiple layers of the base material or printing the multiple layers of lenticular material are performed selectively over surface of the print media.

11. The method of claim 10, further comprising printing an image other than the interlaced selectively over surface of the print media.

12. The method of claim 6, wherein the multiple layers of lenticular material are ordered and dimensioned according to an optical model of the lenticular lenses.

13. The method of claim 6, wherein the printing the multiple layers of the base material comprises the printing the interlaced image.

14. The method of claim 6, further comprising printing multiple separate regions of lenticular material disposed over portions of the interlaced image, wherein different regions of the lenticular material comprise lenses with different optical profiles.

15. The method of claim 14, wherein lenses of a first region of lenticular material have a horizontally-oriented optical profile and lenses of a second region of lenticular material have a vertically-oriented optical profile.

16. The method of claim 6, further comprising shifting an optical profile of the lenses away from centered toward an intended viewing angle.

17. A lenticular effect image product comprising:
a print media:
a printed faceted surface disposed on the print media, the printed faceted surface comprising multiple stacked layers of deposited material in a pattern that forms facets of the printed faceted surface; and
an interlaced image printed on the printed faceted surface.

18. The lenticular effect image product of claim 17, wherein the faceted surface is printed selectively over regions of the print media, the faceted surface comprising regions of ridges oriented at different angles relative to one another.

19. The lenticular effect image product of claim 17, further comprising multiple separate regions of lenticular material disposed over portions of the interlaced image, wherein different regions of the lenticular material comprise lenses with different optical profiles.

20. The lenticular effect image product of claim 19, wherein lenses of a first region of lenticular material have a horizontally-oriented optical profile and lenses of a second region of lenticular material have a vertically-oriented optical profile.

* * * * *